United States Patent [19]
Senbongi et al.

[11] Patent Number: 6,034,735
[45] Date of Patent: Mar. 7, 2000

[54] CLOCK GENERATOR FOR DIGITAL VIDEO SIGNAL PROCESSING APPARATUS

[75] Inventors: Toru Senbongi, Yokohama; Hitoshi Matsunaga, Urawa; Hiroshi Odanaga, Tokyo, all of Japan

[73] Assignee: Motorola, Inc., Schaumburg, Ill.

[21] Appl. No.: 08/827,727

[22] Filed: Apr. 8, 1997

[30] Foreign Application Priority Data

Apr. 22, 1996 [JP] Japan ................................. 8-100387

[51] Int. Cl.⁷ ................................................. H04N 9/45
[52] U.S. Cl. ........................ 348/505; 348/506; 348/508; 348/638
[58] Field of Search ................................. 348/505, 537, 348/549, 507, 506, 508, 663, 638; H04N 9/45, 9/66

[56] References Cited

U.S. PATENT DOCUMENTS

| | | | |
|---|---|---|---|
| 3,760,095 | 9/1973 | Furuhashi et al. | 348/507 |
| 4,402,005 | 8/1983 | Lewis, Jr. | 348/507 |
| 4,558,348 | 12/1985 | Bolger et al. | 348/538 |
| 4,633,298 | 12/1986 | Steckler et al. | 348/539 |
| 4,647,968 | 3/1987 | Willis | 348/574 |
| 4,686,560 | 8/1987 | Balaban et al. | 348/508 |
| 4,694,326 | 9/1987 | Demmer | 348/508 |
| 4,700,217 | 10/1987 | Balaban et al. | 348/639 |
| 4,703,340 | 10/1987 | Balaban et al. | 348/505 |
| 4,724,476 | 2/1988 | Nakagawa et al. | 348/453 |
| 4,785,352 | 11/1988 | Burrowes et al. | 348/678 |
| 5,396,294 | 3/1995 | Fujii et al. | 348/508 |
| 5,459,524 | 10/1995 | Cooper | 348/507 |
| 5,635,995 | 6/1997 | Strolle et al. | 348/727 |
| 5,654,767 | 8/1997 | Ikeda et al. | 348/638 |
| 5,703,656 | 12/1997 | Shreve et al. | 348/549 |
| 5,748,260 | 5/1998 | Hatano | 348/663 |
| 5,767,915 | 6/1998 | Hulvey | 348/509 |
| 5,815,220 | 9/1998 | Marshall | 348/727 |

*Primary Examiner*—Michael H. Lee
*Assistant Examiner*—Jean W. Désir
*Attorney, Agent, or Firm*—Rennie W. Dover

[57] ABSTRACT

A clock generation circuit for a digital video processing apparatus which has a simple structure and can be stably worked in both luminance and color signal systems. A color burst phase error signal indicative of phase difference of a color burst signal is produced on the basis of two color difference signals, a sampling clock signal is generated in accordance with the color burst phase error signal, the sampling clock is divided in order to produce a chrominance subcarrier signal, and the phase of the chrominance subcarrier signal is adjusted in accordance with the color burst phase error signal.

8 Claims, 2 Drawing Sheets

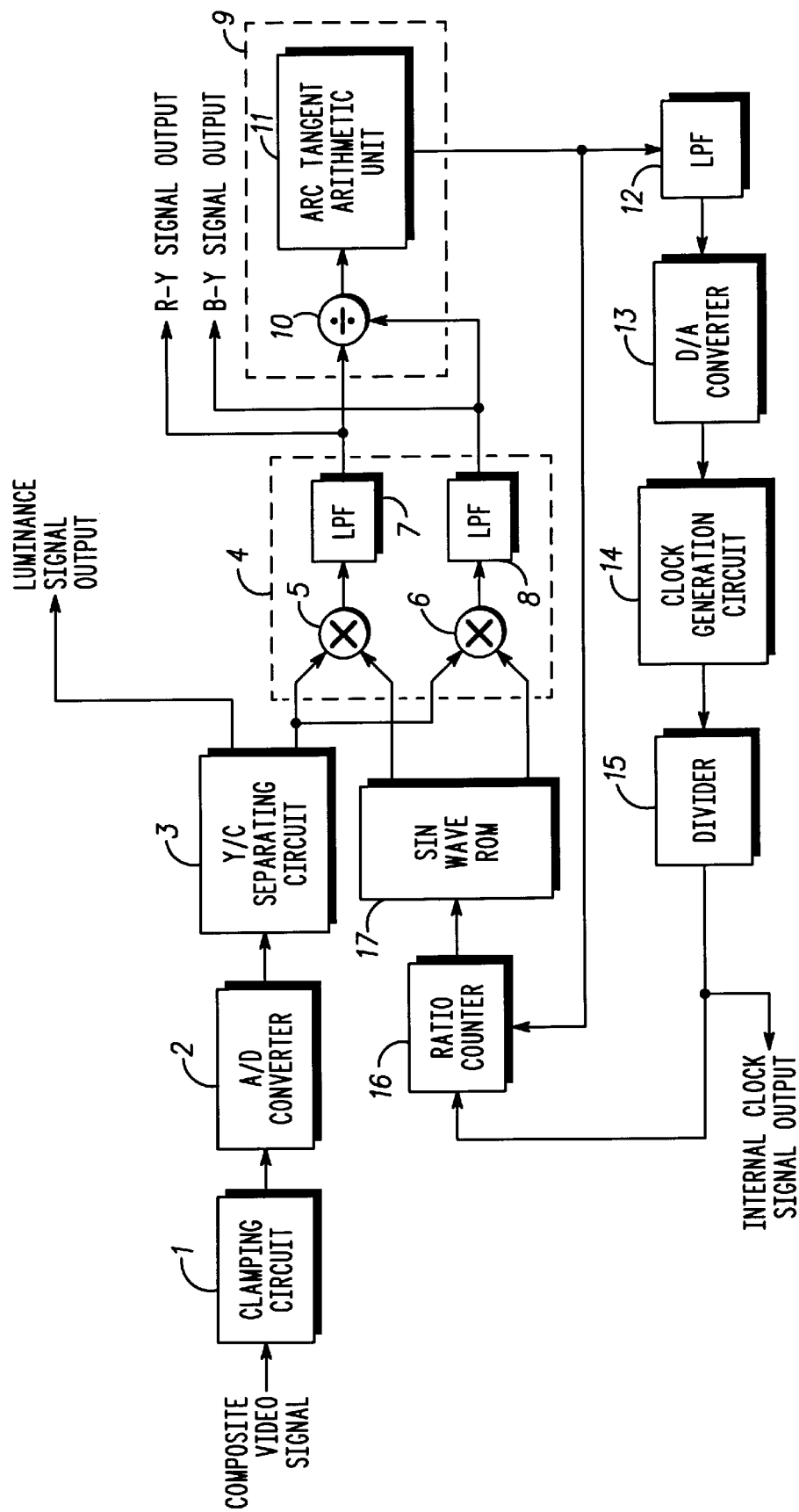

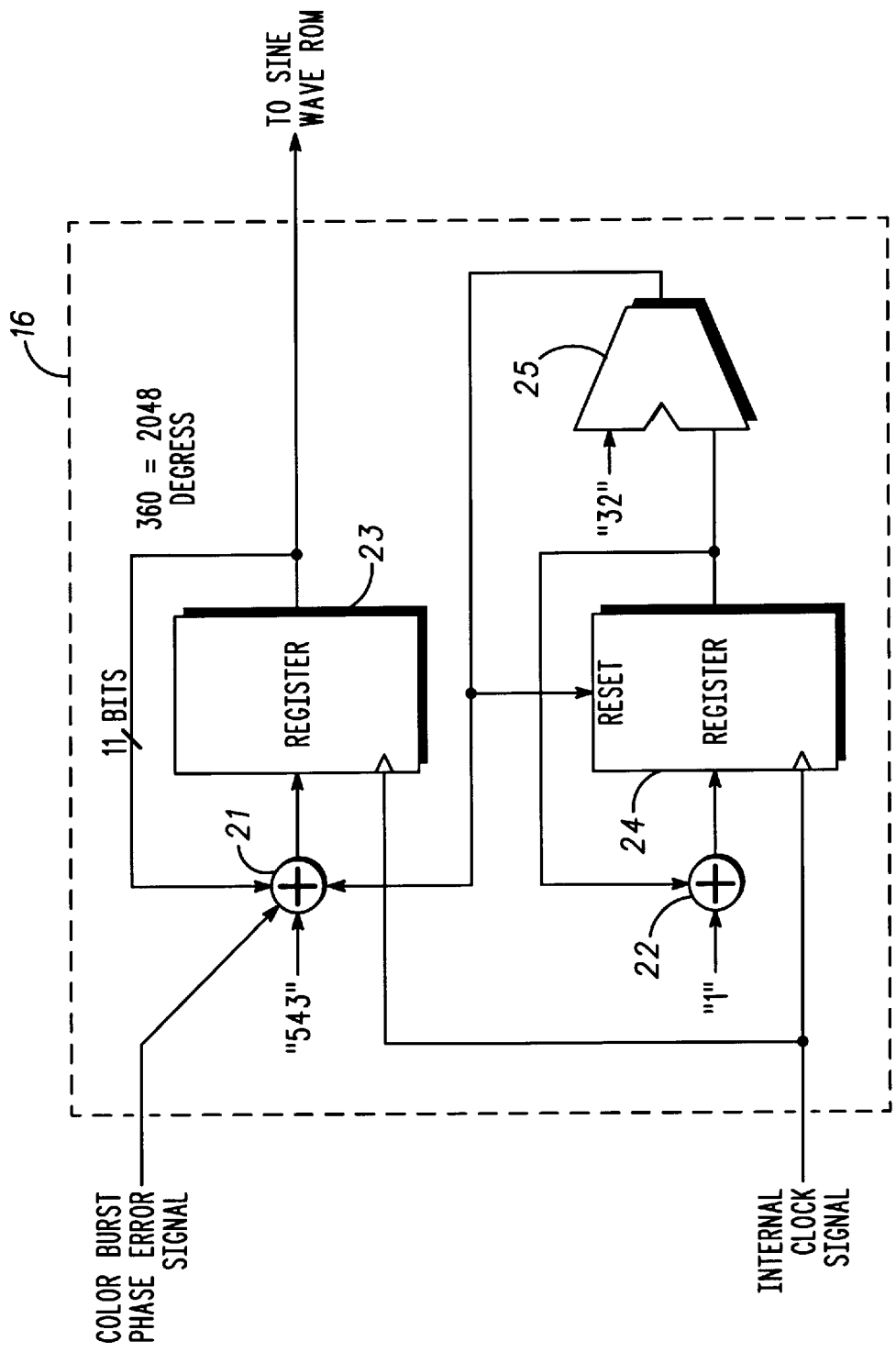

CLOCK GENERATOR FOR DIGITAL VIDEO SIGNAL PROCESSING APPARATUS

FIELD OF THE INVENTION

This invention relates to a clock generation circuit using a burst locked PLL system in a digital video processing apparatus which digitizes an analog composite video signal and processes the digitized video signal to obtain reproduced signals.

BACKGROUND OF THE INVENTION

With an apparatus for converting an analog video signal to a digital video signal and then digitally demodulating it into a baseband signal for digital processing in compliance with the digital video signal processing standards (e.g., ITU-R601), and modulating it back into a video signal, it is a common practice that a sampling clock signal of 13.5 MHz is created in synchronization with a horizontal sync signal, and in accordance with the resulting sampling clock signal, luminance and color signals are demodulated and modulated. More specifically, a horizontal sync signal is extracted from a digital video signal to detect a phase difference between the extracted horizontal sync signal and a reference horizontal sync signal per line, so that a sampling clock signal is produced according to the phase difference detected. This sampling clock generation scheme is called a "Line Locked" PLL. Because both horizontal and vertical sync signals can be extracted accurately by using this sampling clock signal to sample the analog video signal for digitization, the luminance signal can be demodulated and modulated without losing a temporal relationship between the horizontal and vertical sync signals and the luminance signal.

Besides the line locked PLL system, a burst locked PLL system is also known which produces a chrominance subcarrier signal in synchronization with a color burst signal contained in a digital video signal. With this burst locked PLL system, a color burst signal is extracted from a digital video signal to detect a phase error between the extracted color burst signal and a reference color burst signal, and, according to the resulting phase error, an oscillation signal having four times the frequency of the chrominance subcarrier signal is generated and divided by four to generate a chrominance subcarrier signal. If digital video processing is performed using the chrominance subcarrier signal obtained in the burst locked PLL system, the color signal can be demodulated and modulated stably.

If the sampling clock signal of 13.5 MHz is produced by the line locked PLL system, the luminance signal is locked to the horizontal sync signal, so that a temporal relationship between the sampled horizontal and vertical sync signals and the luminance signal is maintained normal. However, because each video apparatus, such as VCRs (video cassette recorders), has variations and errors in its sync signal, if the sampling clock signal based on that sync signal is used to process the color signal, the color signal could not be processed appropriately as the sampling clock signal varies, leading to color degradation, for example, during color demodulation. Furthermore, when the composite video signal is Y/C separated by a Y/C separation circuit, such as a comb filter, into a luminance and a color signal, degradation in separation will also result.

On the other hand, if a sampling clock signal of 13.5 MHz is produced by the burst locked PLL system, there is a problem that the clock generation circuit becomes complicated.

Accordingly, it is an object of the present invention to provide a clock generation circuit that is simple in structure and permit stable operation in both luminance and color signal processing subsystems.

SUMMARY OF THE INVENTION

The present invention encompasses a clock generation circuit for generating a sampling clock signal in a digital video processing apparatus which digitizes an analog composite video signal in accordance with the sampling clock signal, extracts color and luminance signals from the digitized composite video signal, and produces two color difference signals by digital-demodulating the color signal in accordance with a chrominance subcarrier signal in demodulation means, comprising:

burst phase error detection means for outputting a color burst phase error signal indicative of phase difference of a color burst signal on the basis of the two color difference signals;

oscillation means for generating the sampling clock signal in accordance with the color burst phase error signal; and dividing means for dividing the sampling clock so as to produce the chrominance subcarrier signal and for adjusting the phase of the chrominance subcarrier signal in accordance with the color burst phase error signal.

BRIEF DESCRIPTION OF THE INVENTION

FIG. 1 is a block diagram illustrating an embodiment of the present invention.

FIG. 2 is a specific block diagram illustrating the configuration of the ratio counter in the apparatus of FIG. 1.

DETAILED DESCRIPTION OF THE INVENTION

An embodiment of the present invention is described below with reference to the drawings.

In a video processing apparatus employed in a digital television receiver shown in FIG. 1, an A/D converter 2 is connected via a clamp circuit 1 to its video input. The clamp circuit 1 clamps an analog composite video signal output from a video playback apparatus, such as a VCR (video cassette recorder), at a sync chip or pedestal level. The A/D converter 2 samples the clamped analog composite video signal according to an internal clock signal (sampling clock signal) described hereinbelow and converts it to a digital video signal. The video signal digitized by the A/D converter 2 is supplied to a Y/C separation circuit 3. The Y/C separation circuit 3, which is comprised of a comb filter, for example, extracts a digital luminance signal and a digital color signal from the digital video signal output of the A/D converter 2. The digital color signal from the Y/C separation circuit 3 is supplied to a color phase demodulator 4. The color phase demodulator 4 is comprised of multipliers 5 and 6 and LPFs (low-pass filters) 7 and 8, where a R-Y signal, or red color difference signal, is derived by the multiplier 5 and LPF 7, while a B-Y signal, or blue color difference signal, is derived by the multiplier 6 and LPF 8. The digital luminance signal, R-Y signal, and B-Y signal are adjusted for their level and phase by means, not shown, and then processed so as to provide a RGB signal.

The R-Y and B-Y signals are also supplied to a burst phase detector 9. The burst phase detector 9, which includes a divider 10 and an arc tangent computing element 11, produces a color burst phase error signal from the R-Y and B-Y signals during a color burst interval. To the output of the burst phase detector 9 is connected via an LPF 12 a D/A converter 13. The LPF 12 integrates the color burst phase error signal output from the burst phase detector 9 and supplies the resulting integrated signal to the D/A converter 13. The D/A converter 13 converts the integrated color burst phase error signal to an analog signal. To the output of the D/A converter 13 is connected a clock oscillation circuit (VCO) 14, which is a voltage-controlled crystal oscillation circuit for generating a master clock with a frequency and a phase corresponding to the color burst phase error signal that has been converted to analog form. The reference frequency of this master clock is 40.5 MHz. The master clock signal is divided by 3 by a divider 15 to provide an internal clock signal of 13.5 MHz. Sampling of the A/D converter 2 is performed according to this internal clock signal.

Furthermore, the output signal of the burst phase detector 9, or color burst phase error signal, is supplied along with the internal clock signal to a ratio counter 16. The ratio counter 16 divides the internal clock by N to produce a chrominance subcarrier signal. Now, assuming that the frequency of the internal clock signal is $f_s$ and the frequency of the chrominance subcarrier signal is $f_{sc}$, then $1/N=f_{sc}/f_s$. For an NTSC-based television system, $N=(858\times4)\div910$. It should be noted that for an internal clock signal frequency $f_s=13.5$ MHz, there are relationships, $f_{sc}/f_H=910/4$ and $f_s=858 f_H$, where the frequency of the internal clock signal is $f_s$, the frequency of the chrominance subcarrier signal is $f_{sc}$, and the line frequency is $f_H$.

To the output of the radio counter 16 is connected a sinusoidal (sin) ROM 17. The sin ROM 17 has a data table, and directly outputs the chrominance subcarrier signal output from the ratio counter 16, and obtains from the data table and outputs a phase shift signal having the phase of the chrominance subcarrier signal shifted by 90 degrees. The chrominance subcarrier signal is supplied to the multiplier 5, while the phase shift signal 90 degrees out of phase is supplied to the multiplier 6.

Next, the operation of the video processing apparatus so configured is described. First, an input composite video signal is clamped by the clamp circuit 1 and further digitized by the A/D converter 2. From the digitized composite video signal, a digital luminance signal and a digital color signal are extracted by the Y/C separation circuit 3. The digital color signal is multiplied in the multiplier 5 by the chrominance subcarrier signal from the sin ROM 17, and then passed through the LPF 7 to provide a R-Y signal, while it is multiplied in the multiplier 6 by the 90-degree phase shifted chrominance subcarrier signal from the sin ROM 17, and then passed through the LPF 8 to provide a B-Y signal. According to the resulting R-Y and B-Y signals, a color burst phase error signal is detected in the burst phase detector 9. From the color burst phase error signal, its high-frequency component is removed by the LPF 12 to produce an averaged color burst phase error signal, which is supplied to the D/A converter 13. The averaged color burst phase error signal, which is converted by the D/A converter 13 to analog form, is supplied to the clock oscillation circuit 14. The clock oscillation circuit 14 generates a master clock signal with a frequency and a phase corresponding to the analog, averaged color burst phase error signal, and this master clock signal is divided by 3 by the divider 15 to produce an internal clock signal, i.e., a sampling clock signal. Furthermore, the internal clock signal is divided by N in the ratio counter 16 to produce a chrominance subcarrier signal.

If the frequency of the color burst signal in the input composite video signal is a predetermined frequency of 3.58 MHz and the frequency $f_s$ of the internal clock signal output from the divider 15 is exactly 13.5 MHz, a chrominance subcarrier signal with a frequency of 3.58 MHz is produced when the internal clock signal is divided by N in the ratio counter 16. In this case, the phase of the chrominance subcarrier signal is adjusted in the ratio counter 16 according to the color burst phase error signal, and this adjustment is repeated to reduce to zero the color burst phase error signal obtained at the burst error detector 9.

On the other hand, the frequency $f_s$ of the internal clock signal output from the divider 15 deviates from 13.5 MHz, an averaged color burst phase error signal can be obtained from the LPF 12, where the frequency $f_s$ of the internal clock is controlled to be equal to 13.5 MHz by a feedback loop consisting of the color phase demodulator 4, burst phase detector 9, LPF 12, D/A converter 13, clock oscillation circuit 14, divider 15, ratio counter 16, and sin ROM 17.

A specific configuration of the ratio counter 16 is as shown in FIG. 2. The ratio counter 16 includes two adders 21 and 22, registers 23 and 24, and a comparator 25. To the adder 21 are supplied a signal indicative of a value "543", the color burst phase error signal from the burst phase detector 9, a hold output signal of the register 23, and an output signal of the comparator 25; the adder 21 adds these signals and outputs its sum to the register 23. The output value of the adder 21 varies according to the value of the color burst phase error signal to thereby adjust the phase of the chrominance subcarrier signal. The register 23 freshly holds and outputs a signal available from the adder 21 depending on the rising edge of the internal clock signal. Because the resulting output is supplied to the adder 21, the output of the register 23 is an accumulation of the output values of the adder 21 per internal clock signal. The adder 22 adds a signal indicative of value "1" and the output signal of the register 24, and the register 24 freshly holds and outputs an output signal available from the adder 22 depending on the rising edge of the internal clock signal. To the comparator 25 is supplied a signal indicative of "32" as a reference signal for comparison, along with the output signal of the register 24, and the comparator 25 outputs the signal indicative of "1" to the adder 21 when the output signal value of the register 24 exceeds 32.

With the ratio counter 16 so configured, the following relationship holds true in the case of a NTSC-based television system:

$$f_{sc}/f_s=910/4/858=35/132 \tag{1}$$

Equation (1) may be further rewritten as:

$$f_{sc}/f_s=(543+1/33)/2048 \tag{2}$$

In other words, given Equation (1), the chrominance subcarrier signal advances by $(35/132)$ $360\approx95.45$ degrees during a period of one clock, $1/f_s$; with $(543/2048)360$, the resulting angle is much smaller, so if $\{(543+1)/2048\}360$ holds true once every 33 clocks, then Equation (2) is met. Thus, as shown in FIG. 2, "1" is supplied from the comparator 25 to the adder 21 once every 33 clocks, whereby a chrominance subcarrier signal having a frequency $f_{sc}$ can be generated from the register 23.

It should be appreciated that the present invention is applicable to digital television receivers, VCRs, scanners, video disc players, and so on.

In the above embodiment, the NTSC-based television system has been described, but the present invention can also be applied to television systems based on PAL and other schemes.

Thus, according to the present invention, a color burst phase error signal indicative of a phase error of the color burst signal is generated based on two color difference signals, and according to this color burst phase error signal, a sampling clock signal is generated, which is divided to produce a chrominance subcarrier signal, while the chrominance subcarrier signal is phase adjusted according to the color burst phase error signal, so that stable operation can be achieved in both the luminance and color signal processing subsystems, with a simple architecture. Additionally, only a single clock generation subsystem is needed, beat interference can be reduced as compared to the prior art.

What is claimed is:

1. A clock generator for generating a sampling clock signal in a digital video processing apparatus which digitizes an analog composite video signal in accordance with the sampling clock signal, extracts color and luminance signals from the digitized composite video signal, and produces color difference signals by using the color signal in accordance with a chrominance subcarrier signal in demodulator, the clock generator comprising:

burst phase error detector for outputting a color burst phase error signal based on the color difference signals;

oscillator for generating the sampling clock signal in accordance with the color burst phase error signal; and divider for dividing the sampling clock so as to produce the chrominance subcarrier signal and for adjusting the phase of the chrominance subcarrier signal in accordance with the color burst phase error signal, wherein the divider comprises:

a ratio counter for dividing the clock signal to produce the chrominance subcarrier signal, wherein the ratio counter comprises:

a first signal generator for producing a first signal indicative of "1" at intervals of 33 clocks of the sampling clock signal;

an adder for adding the chrominance subcarrier signal, the color burst phase error signal, a signal indicative of "543", and the signal indicative of "1"; and a register for holding the output signal of the adder depending on the sampling clock signal and outputting the chrominance subcarrier signal; and phase shift signal generator for generating a phase shift signal having a phase of the chrominance subcarrier signal shifted by 90 degrees, and wherein the demodulator comprises:

a first multiplier for multiplying the color signal by the chrominance subcarrier signal;

a first low-pass filter, connected to the output of the first multiplier, for producing a red color difference signal, which is supplied to the burst phase error detector;

a second multiplier for multiplying the color signal by the phase shift signal; and a second low-pass filter, connected to the output of the second multiplier, for producing a blue color difference signal, which is supplied to the burst phase error detector.

2. A clock generator in a digital video processing apparatus according to claim 1, wherein the divider has a division ratio of 1/(858×4)/910 for the sampling clock.

3. A clock generator in a digital video processing apparatus according to claim 1, wherein the burst phase error detector comprises: a divider for dividing the red color difference signal by the blue color difference signal; and an arc tangent calculator for taking an arc tangent of the output signal of the divider to produce the color burst phase error signal.

4. A clock generator in a digital video processing apparatus according to claim 1, wherein the oscillator comprises: a third low-pass filter for averaging the color burst phase error signal; converter for converting the output signal of the third low-pass filter to an analog signal; master clock generator for generating a master clock at a frequency and phase corresponding to the analog signal; and divider for dividing the master clock signal to generate the sampling clock signal.

5. A clock generator for generating a sampling clock signal in a digital video processing apparatus which digitizes an analog composite video signal in accordance with the sampling clock signal, extracts color and luminance signals from the digitized composite video signal, and produces two color difference signals by digital-demodulating the color signal in accordance with a chrominance subcarrier signal in demodulator, the clock generator comprising:

burst phase error detector for outputting a color burst phase error signal indicative of phase difference of a color burst signal on the basis of the two color difference signals;

oscillator for generating the sampling clock signal in accordance with the color burst phase error signal; and divider for dividing the sampling clock so as to produce the chrominance subcarrier signal and for adjusting the phase of the chrominance subcarrier signal in accordance with the color burst phase error signal, wherein the divider comprises:

a ratio counter for dividing the clock signal to produce the chrominance subcarrier signal, wherein the ratio counter comprises:

a first signal generator for producing a first signal indicative of "1" at intervals of 33 clocks of the sampling clock signal;

an adder for adding the chrominance subcarrier signal, the color burst phase error signal, a signal indicative of "543", and the signal indicative of "1"; and a register for holding the output signal of the adder depending on the sampling clock signal and outputting the chrominance subcarrier signal; and phase shift signal generator for generating a phase shift signal having a phase of the chrominance subcarrier signal shifted by 90 degrees, and wherein the demodulator comprises:

a first multiplier for multiplying the color signal by the chrominance subcarrier signal;

a first low-pass filter, connected to the output of the first multiplier, for producing a red color difference signal, which is supplied to the burst phase error detector;

a second multiplier for multiplying the color signal by the phase shift signal; and a second low-pass filter, connected to the output of the second multiplier, for producing a blue color difference signal, which is supplied to the burst phase error detector.

6. A clock generator in a digital video processing apparatus according to claim 5, wherein the divider has a division ratio of 1/(858×4)/910 for the sampling clock.

7. A clock generator in a digital video processing apparatus according to claim 5, wherein the burst phase error detector comprises: a divider for dividing the red color difference signal by the blue color difference signal; and an arc tangent calculator for taking an arc tangent of the output signal of the divider to produce the color burst phase error signal.

8. A clock generator in a digital video processing apparatus according to claim 5, wherein the oscillator comprises: a third low-pass filter for averaging the color burst phase error signal; converter for converting the output signal of the third low-pass filter to an analog signal; master clock generator for generating a master clock at a frequency and phase corresponding to the analog signal; and divider for dividing the master clock signal to generate the sampling clock signal.

* * * * *